(12) United States Patent
Shiga

(10) Patent No.: US 7,895,170 B2
(45) Date of Patent: Feb. 22, 2011

(54) DOCUMENT MANAGEMENT APPARATUS, DOCUMENT MANAGEMENT PROGRAM, AND RECORDING MEDIUM

(75) Inventor: Yuki Shiga, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 410 days.

(21) Appl. No.: 12/068,987

(22) Filed: Feb. 14, 2008

(65) Prior Publication Data

US 2008/0215635 A1   Sep. 4, 2008

(30) Foreign Application Priority Data

Feb. 14, 2007 (JP) .............................. 2007-034131
Dec. 12, 2007 (JP) .............................. 2007-320431

(51) Int. Cl.
G06F 7/00 (2006.01)
G06F 17/00 (2006.01)

(52) U.S. Cl. ...................... 707/695; 707/704; 707/729; 715/769; 715/862

(58) Field of Classification Search ................. 707/695, 707/704, 729; 715/769, 862
See application file for complete search history.

(56) References Cited

U.S. PATENT DOCUMENTS

| | | | |
|---|---|---|---|
| 5,862,395 A * | 1/1999 | Bier ............................... | 712/1 |
| 6,199,081 B1 * | 3/2001 | Meyerzon et al. ........... | 715/210 |
| 6,240,429 B1 * | 5/2001 | Thornton et al. ............ | 715/229 |
| 6,252,593 B1 * | 6/2001 | Gti .............................. | 715/781 |
| 6,370,538 B1 * | 4/2002 | Lamping et al. ............... | 707/1 |
| 6,457,013 B1 * | 9/2002 | Saxton et al. .................. | 707/1 |
| 6,678,705 B1 * | 1/2004 | Berchtold et al. ............. | 707/2 |
| 6,697,997 B1 * | 2/2004 | Fujimura .................... | 715/210 |

(Continued)

FOREIGN PATENT DOCUMENTS

CN   1838111   9/2006

(Continued)

OTHER PUBLICATIONS

Dourish et al.—"Extending Document Management Systems with User-specific Active Properties"—Xerox Palo Alto Research center, ACM Transactions on Information Systems, vol. 18, No. 2, Apr. 2000, (pp. 140-170).*

(Continued)

Primary Examiner—John E Breene
Assistant Examiner—Anh Ly
(74) Attorney, Agent, or Firm—Harness, Dickey & Pierce, P.L.C.

(57) ABSTRACT

A document management apparatus for managing stored documents together with document properties that are attribute information attached to the documents includes a document property continuous setting unit that continuously changes the document properties of each document of a plurality of documents when changing the document properties of the plurality of the documents. The document management apparatus may also include a candidate value attachment unit, a candidate value cancellation unit, and a document list display unit. The candidate value attachment unit automatically displays a candidate value for a document of the plurality of the documents, the properties of which are input based on a previously input value. The candidate value cancellation unit cancels a function of the candidate value attachment unit in accordance with a setting. The document list display unit is configured to display a list of selected documents subjected to property editing.

9 Claims, 10 Drawing Sheets

U.S. PATENT DOCUMENTS

| | | | |
|---|---|---|---|
| 6,915,299 B1* | 7/2005 | Arcuri et al. | 1/1 |
| 7,035,839 B1* | 4/2006 | Gillespie et al. | 1/1 |
| 7,146,367 B2* | 12/2006 | Shutt | 1/1 |
| 7,281,049 B2* | 10/2007 | Verma et al. | 709/229 |
| 7,493,307 B2* | 2/2009 | Gillespie et al. | 707/999.002 |
| 2002/0101450 A1* | 8/2002 | Magendanz et al. | 345/764 |
| 2003/0115326 A1* | 6/2003 | Verma et al. | 709/225 |
| 2003/0217034 A1* | 11/2003 | Shutt | 707/1 |
| 2004/0073606 A1* | 4/2004 | Verma et al. | 709/203 |
| 2005/0154690 A1* | 7/2005 | Nitta et al. | 706/46 |
| 2005/0165734 A1* | 7/2005 | Vicars et al. | 707/2 |
| 2005/0172224 A1* | 8/2005 | Kobashi et al. | 715/517 |
| 2005/0246313 A1* | 11/2005 | Turski et al. | 707/1 |
| 2005/0267917 A1* | 12/2005 | Arcuri et al. | 707/200 |
| 2005/0289452 A1* | 12/2005 | Kashi et al. | 715/512 |
| 2006/0149795 A1* | 7/2006 | Gillespie et al. | 707/203 |
| 2006/0221370 A1* | 10/2006 | Iida | 358/1.13 |
| 2006/0232810 A1* | 10/2006 | Kishino | 358/1.13 |
| 2006/0259860 A1* | 11/2006 | Kobashi | 715/521 |
| 2007/0078853 A1* | 4/2007 | Shutt | 707/8 |
| 2007/0143324 A1* | 6/2007 | Eichhorst | 707/101 |
| 2007/0229856 A1* | 10/2007 | Komine | 358/1.1 |

FOREIGN PATENT DOCUMENTS

| | | |
|---|---|---|
| JP | 2002-269150 | 9/2002 |
| JP | 2004-240488 | 8/2004 |

OTHER PUBLICATIONS

Norman Meyrowitz—"Intermedia: The Architecture and Construction of an Object-oriented Hypermedia System and Applications Framework"—vol. 12, Issue 11 (Nov. 1986)—Proceedings of the 1986 conference on Object-Oriented Programming Systems, Languages and Applications. (pp. 186-201).*

H. M. Gladney—"A Storage Subsystem for Image and records Management"—IBM Systems Journal, vol. 32, No. 2, 1993 (pp. 512-540).*

Li Haibing et al. "Access 2003 database management from entry to the master." China Youth Publishing House, Feb. 2005.

Chinese Office Action dated.

Partial translation of Haibing Li et al. "Computer Office from Dummy to Mater-Access 2003 Database Management from Dummy to Master." China Youth Press, Feb. 2005.

* cited by examiner

FIG. 4

EDIT DOCUMENT PROPERTY

| | |
|---|---|
| DOCUMENT TITLE | MEETING MATERIAL 2 |
| SIZE | 30 KB |
| PATH | Server¥¥MEETING DOCUMENT |
| REGISTRATION DATE | 2006/07/04 |
| LAST UPDATED | 2006/07/04 |
| CREATED BY | Taro Yamada |
| NOTE | |

[ OK ]  [ CANCEL ]  [ PREVIOUS DOCUMENT ] [ NEXT DOCUMENT ]

FIG. 5

LIST OF DOCUMENTS (DOCUMENT PROPERTY BEING EDITED)

Aaa.txt

Bbb.png

Ccc.doc (COMPLETED) MEETING MATERIAL.txt (DOCUMENT LIST SCREEN)

FIG. 7

PROPERTIES OF DOCUMENT 'aaa'

DOCUMENT INFORMATION | GENERAL | CONTENTS

EDITION: 1 . 0   COMMENT (C)...   BB1  BB2
DOCUMENT TYPE (T): BASIC
DOCUMENT NAME (N): aaa
DOCUMENT NUMBER: 6699
CREATED BY (U):
REGISTERED DATE: 2005/10/28 22:38:54
LAST UPDATED: 2005/10/28 22:38:54
CREATION DATE (D): 2005/10/29  00:37:47
STORAGE PERIOD (R): 2010/10/28
STATUS (W): ○ IN PROGRESS  ⊙ COMPLETED
SIZE: 18,415 bites
NOTE (Q):

DETAIL (S)...

OK    CANCEL    APPLY (A)    HELP (H)

BB3    BB4
(PROPERTY DIALOGUE SCREEN)

FIG. 8

Property is changed. Do you want to apply?

⦿ Yes. Apply the change (A)
☐ Do not show this message again (B)

○ No. Do not apply the change (N)

OK   CANCEL

DOCUMENT MANAGEMENT APPARATUS, DOCUMENT MANAGEMENT PROGRAM, AND RECORDING MEDIUM

CROSS-REFERENCE TO RELATED APPLICATIONS

This patent application is based on and claims priority under 35 U.S.C. §119 from Japanese Patent Application No. JP2007-034131 filed on Feb. 14, 2007 in the Japan Patent Office, and Japanese Patent Application No. JP2007-320431 filed on Dec. 12, 2007 in the Japan Patent Office, the entire contents of each of which are hereby incorporated herein by reference.

BACKGROUND OF THE INVENTION

1. Field of the Invention

Exemplary aspects of the present invention generally relate to a document management apparatus, a document management program product, and a computer readable recording medium on which is recorded the document management program, and more particularly, to a document management apparatus, a document management program product, and a computer readable recording medium on which is recorded a document management program capable of enhancing document properties alteration efficiency.

2. Description of the Background Art

Conventionally, two general ways of modifying document properties are known. One such method selects a single document and then changes the document properties of a document. The other method selects all documents, the document properties of which are subjected to change in advance, and makes the same change with respect to all documents at once.

However, in either method, it is difficult to continuously and seamlessly input properties relative to an individual document, causing inconvenience to a user. Such inconvenience includes, for example, that an appropriate change is not made, or an unintended change is made. As a result, the user is required to bear the burdens and risks of human error.

Furthermore, even if it is made possible to continuously and seamlessly input the properties for the individual document, it is troublesome to input the same information or values repeatedly upon changing document properties, for example.

In addition, even if it is made possible to achieve continuous and seamless modification of document properties, when editing a large volume of document properties, there is an increasing risk of an occurrence of human error as the number of documents increases.

In related art disclosed in Japanese Laid-Open Patent Application No. 2004-240488, an optical character reader (hereinafter referred to as an OCR) automatically converts contents of a document to character data and extract data presumably associated with a date or time from the character data. Subsequently, the extracted data is added as a document property to the document.

In the related art, the OCR is employed to automatically add information as a document property to the document assuming that there is information already existing in the document. Moreover, the document properties to be added are limited to a date and a time.

SUMMARY OF THE INVENTION

In view of the foregoing, exemplary embodiments of the present invention provide a document management apparatus, a document management program product, and a computer readable recording medium recorded with the document management program.

In one exemplary embodiment, a document management apparatus for managing stored documents together with document properties that are attribute information attached to the documents includes a document property continuous setting unit. The document property continuous setting unit is configured to continuously change the document properties of each document of a plurality of documents when changing the document properties of the plurality of the documents.

The document management apparatus includes a candidate value attachment unit and a candidate value cancellation unit. The candidate value attachment unit is configured to automatically display a candidate value for a document of the plurality of the documents, the properties of which are being input based on a previously input value. The candidate value cancellation unit is configured to cancel a function of the candidate value attachment unit in accordance with a setting.

Another exemplary embodiment provides the document management apparatus including a document list display unit. The document list display unit is configured to display a list of selected documents subjected to property editing.

Yet another exemplary embodiment provides a method for managing stored documents together with document properties that are attribute information attached to the documents. The method includes continuously changing the document properties of each document of a plurality of documents when changing the document properties of the plurality of the documents.

Yet another and further exemplary embodiment provides the method including displaying a list of selected documents subjected to property editing.

Still yet another and further exemplary embodiment provides a computer readable recording medium storing a program for causing the computer to execute a method of managing stored documents together with document properties that are attribute information attached thereto. The method includes continuously changing the document properties of each document of a plurality of documents when changing the document properties of the plurality of the documents.

Still yet another and further exemplary embodiment provides a document management apparatus for managing stored documents together with document properties that are attribute information attached to the documents. The document management apparatus includes means for changing the document properties of each document of a plurality of documents when changing the document properties of the plurality of the documents.

Additional features and advantages of the present invention will be more fully apparent from the following detailed description of exemplary embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of exemplary embodiments when considered in connection with the accompanying drawings, wherein:

FIG. 4 is a diagram illustrating a display example of a document property edit screen after document property font change processing, according to an exemplary embodiment of the present invention;

FIG. 5 is a diagram illustrating a display example of the document property edit screen after document list icon change processing, according to an exemplary embodiment;

FIG. 7 is a diagram illustrating a display example of a property dialogue screen, according to an exemplary embodiment;

FIG. 8 is a diagram illustrating another display example of the property dialogue screen, according to an exemplary embodiment of the present invention;

DETAILED DESCRIPTION OF EXEMPLARY EMBODIMENTS

Figure 1:
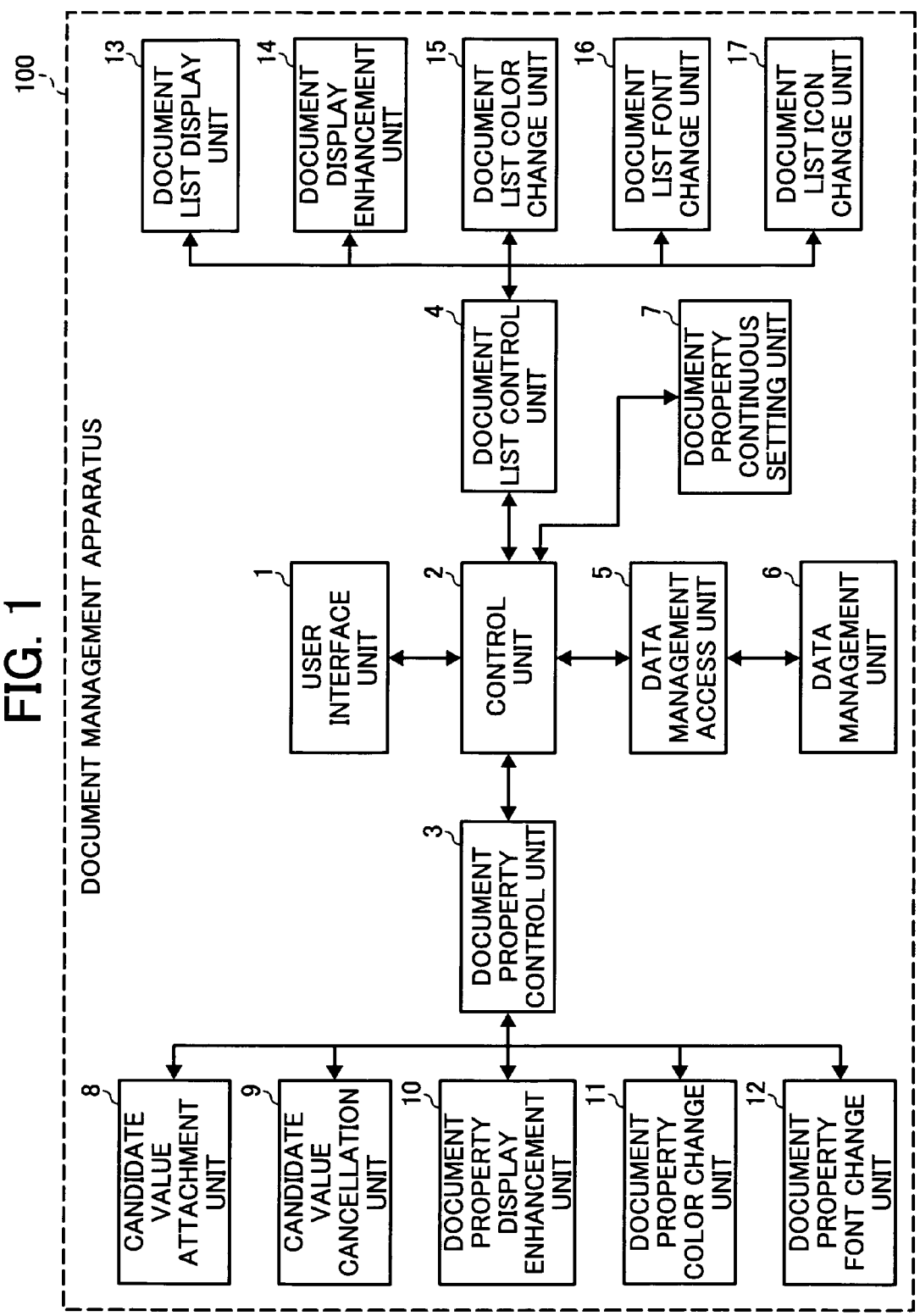
FIG. 1 is a block diagram illustrating a document management apparatus, according to an exemplary embodiment of the present invention.

It will be understood that if an element or layer is referred to as being "on," "against," "connected to" or "coupled to" another element or layer, then it can be directly on, against connected or coupled to the other element or layer, or intervening elements or layers may be present.

In contrast, if an element is referred to as being "directly on," "directly connected to" or "directly coupled to" another element or layer, then there are no intervening elements or layers present. Like numbers refer to like elements throughout figures. As used herein, the term "and/or" includes any and all combinations of one or more of the associated listed items.

Spatially relative terms, such as "beneath," "below," "lower," "above," "upper" and the like, may be used herein for ease of description to describe an element or an element's feature or relationship to another element(s) or feature(s) as illustrated in the figures.

It will be understood that the spatially relative terms are intended to encompass different orientations of the device in use or operation in addition to the orientation depicted in the figures.

For example, if the device in the figures is turned over, elements described as "below" or "beneath" other elements or features would then be oriented "above" the other elements or features. Thus, the term such as "below" can encompass both an orientation of above and below.

The device may be otherwise oriented at various angles (i.e. rotated 90 degrees or at other orientations), and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms.

These terms are used only to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

In the later described comparative example, exemplary embodiment, and alternative example, for the sake of simplicity of drawings and descriptions, the same reference numerals will be given to constituent elements such as parts and materials having the same functions, and the descriptions thereof will be omitted unless otherwise stated.

Typically, but not necessarily, paper is the medium from which is made a sheet on which an image is to be formed. Other printable media are available in sheets and their use here is included. For simplicity, this Detailed Description section refers to paper, sheets thereof, paper feeder, etc. It should be understood, however, that the sheets, etc., are not limited only to paper.

Exemplary embodiments of the present invention are now described below with reference to the accompanying drawings.

Referring now to the drawings, wherein like reference numerals designate identical or corresponding parts throughout the several views, particularly to FIG. 1, a document management apparatus according to an exemplary embodiment of the present invention is described.

FIG. 1 is a block diagram illustrating a document management apparatus 100 according to one exemplary embodiment of the present invention.

In FIG. 1, the document management apparatus 100 includes at least a user interface 1, a control unit 2, a document property control unit 3, a document list control unit 4, a data management access unit 5, a data management unit 6, a document property continuous setting unit 7, a candidate value attachment unit 8, a candidate value cancellation unit 9, a document property display enhancement unit 10, a document property color change unit 11, a document property font change unit 12 and so forth.

The user interface unit 1 enables a display device, for example, a display, to display various kinds of screens, and enables an input device, for example, a keyboard and a mouse, to perform various operations.

Based on setting information set by the document property control unit 3, the document list control unit 4, and the document property continuous setting unit 7, the control unit 2 enables the data management access unit 5 to control a sequence of operations for storing information in the data management unit 6.

The document property control unit 3 causes the candidate value attachment unit 8, the candidate value cancellation unit 9, the document property display enhancement unit 10, the document property color change unit 11, and the document property font change unit 12 to control a sequence of operations associated with inputting the document properties.

The document list control unit 4 causes a document list display unit 13, a document display enhancement unit 14, a document list color change unit 15, a document list font change unit 16, and a document list icon change unit 17 to control a sequence of operations associated with displaying a document list.

The data management unit 6 stores information with respect to an electronic document and properties attached to the electronic document.

The document property continuous setting unit 7 continuously and seamlessly switches screens for editing the document properties.

The candidate value attachment unit 8 displays candidate values for each item of the document properties currently to be subjected to input based on the values for each item of the document properties input in the past.

The candidate value cancellation unit 9 cancels the candidate value attachment unit 8.

The document property control unit 3 determines the items of the document properties to be most likely input by a user. The document property display enhancement unit 10 enhances the visibility of document property items using the document property color change unit 11 and the document property font change unit 12.

The document property color change unit 11 changes a color of a specific document property so that the visibility is enhanced, enabling the user to recognize the document property more easily.

The document property font change unit 12 changes a font of a specific document property so that the visibility is enhanced, enabling the user to recognize the document property more easily.

The document list display unit 13 displays a list of documents subjected to a property editing regardless of an existing window or a new window.

The document display enhancement unit 14 enhances the visibility of the document of which property the user has input on the document list screen.

The document list color change unit 15 changes a color of a specific document on the document list screen so that the visibility is enhanced, enabling the user to recognize the document property more easily.

The document list-font change unit 16 changes a font of a specific document on the document list screen so that the visibility is enhanced, enabling the user to recognize the document property more easily.

The document list icon change unit 17 employs a certain icon relative to a specific document on the document list screen so that the visibility is enhanced, enabling the user to recognize the document property more easily.

Figure 2:
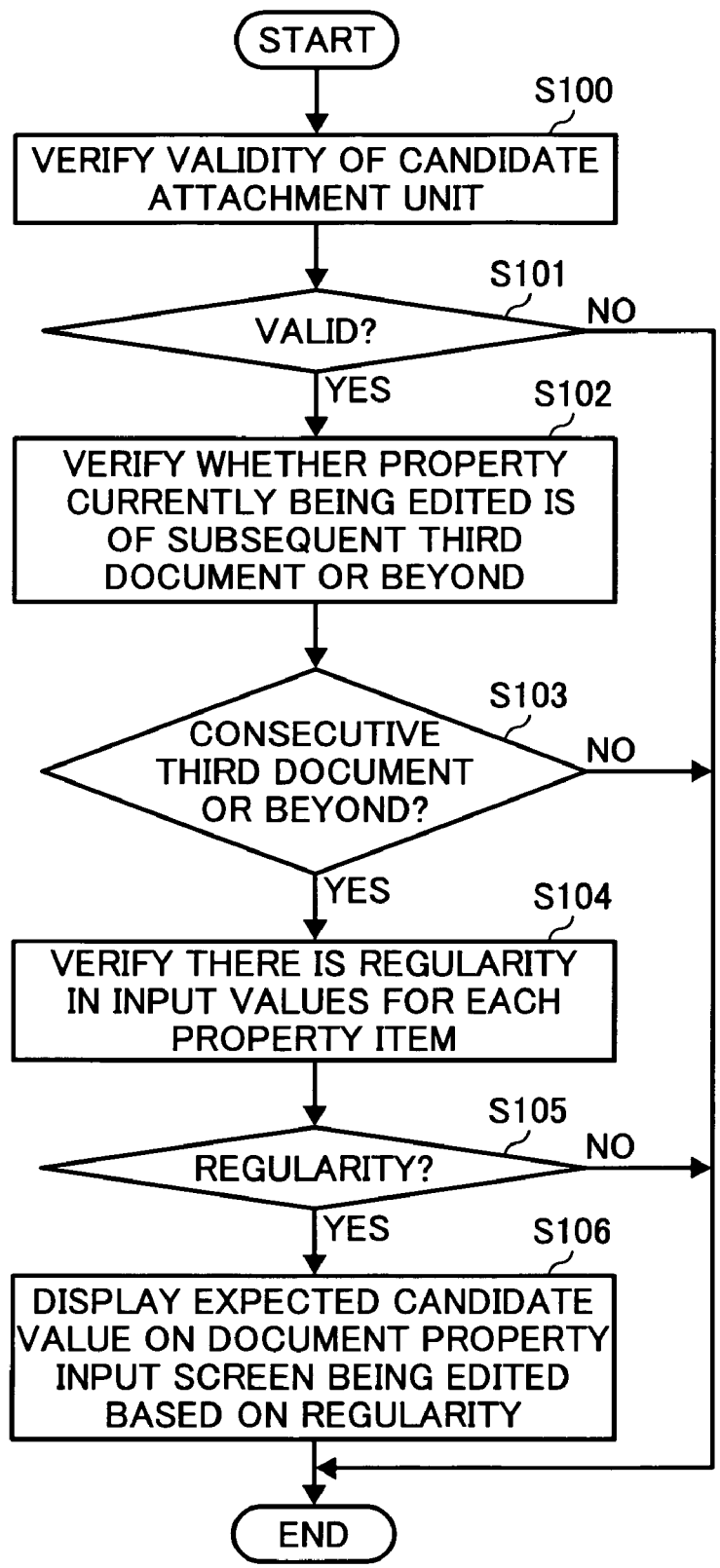
FIG. 2 is a flowchart showing an exemplary procedure of a candidate value attachment process in the document management apparatus of FIG. 1, according to an exemplary embodiment of the present invention.

Referring now to FIG. 2, there is provided a flowchart showing an exemplary procedure of the candidate value attachment processing performed by the document management apparatus 100.

In the exemplary process shown in FIG. 2, first, in step S100, the control unit 2 verifies whether or not the candidate value attachment unit 8 is valid, when an edit screen for the document properties is displayed. The verification is performed because the candidate value attachment cancellation unit 9 may cancel the validity of the candidate value attachment unit 8, and thus the validity of the candidate value attachment unit 8 may vary between "VALID" and "INVALID".

When the result is YES in step S101, that is, the result indicates "VALID", whether the property currently being edited is of a subsequent third document or beyond is verified in step S102.

When the document is the third document or beyond, that is, the result is YES in step S103, subsequently, in step S104, whether or not there is regularity (for example, the exact same value for prefix/postfix) is confirmed for each item based on the value input by the user in the past.

When it is determined that there is regularity, that is, the result is YES in step S105, the candidate value is displayed on the screen based on the regularity in step S106.

Figure 3:
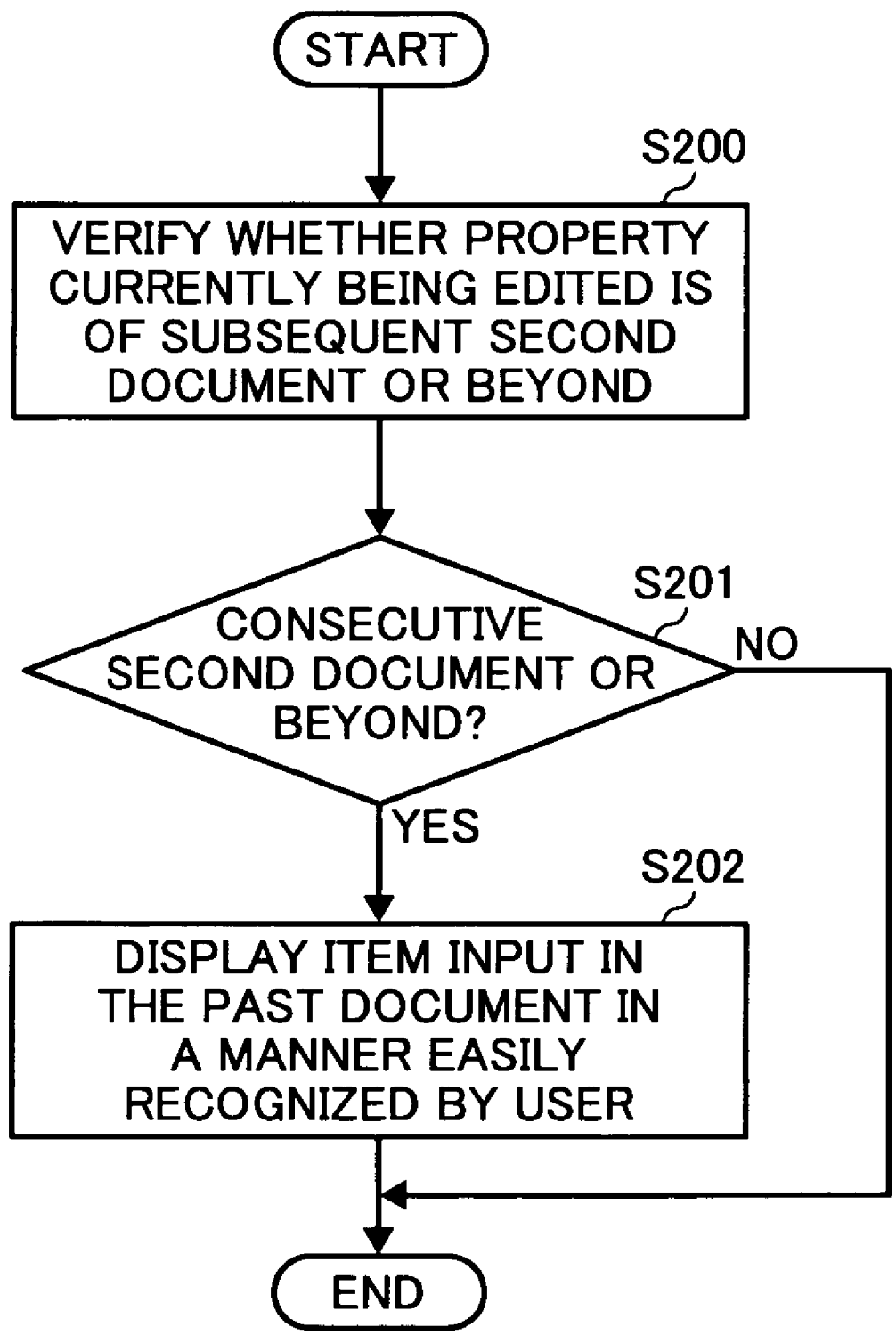
FIG. 3 is a flowchart showing an exemplary procedure of changing a font of document properties in the document management apparatus of FIG. 1, according to an exemplary embodiment of the present invention.

Referring now to FIG. 3, there is provided a flowchart showing an exemplary procedure of changing the font of the document properties in document management apparatus 100.

In the exemplary process shown in FIG. 3, when the edit screen for the document properties is displayed, the control unit 2 verifies whether the document, the property of which is currently edited, is a second document or beyond in step S200.

When the document is the second document or beyond, that is, the result is YES in step S201, subsequently, an item of the document input in the past is displayed in a manner easily recognizable by the user in step S202. In other words, the item is displayed in a different font.

Referring now to FIG. 4, there is provided a diagram illustrating a display example of the edit screen for the document properties using the document property font change unit 12.

In this example, the document property font change unit 12 distinguishes the value for the document title (Meeting Material 2) from other values by displaying the document title in italics, for example.

Referring now to FIG. 5, there is provided a diagram illustrating a display example of the edit screen for the document properties using the document list icon change unit 17.

In this example, the document list icon change unit 17 provides the document "Meeting Material.txt" with an icon indicating that the change has been made. In the exemplary embodiment, a circled word "COMPLETED", for example, is displayed to indicate that the change has been completed.

According to the exemplary embodiments of the present invention, the efficiency of changing the document properties can be enhanced, and the operation processes can be reduced. Accordingly, the risk of human error can be mitigated.

Figure 6:
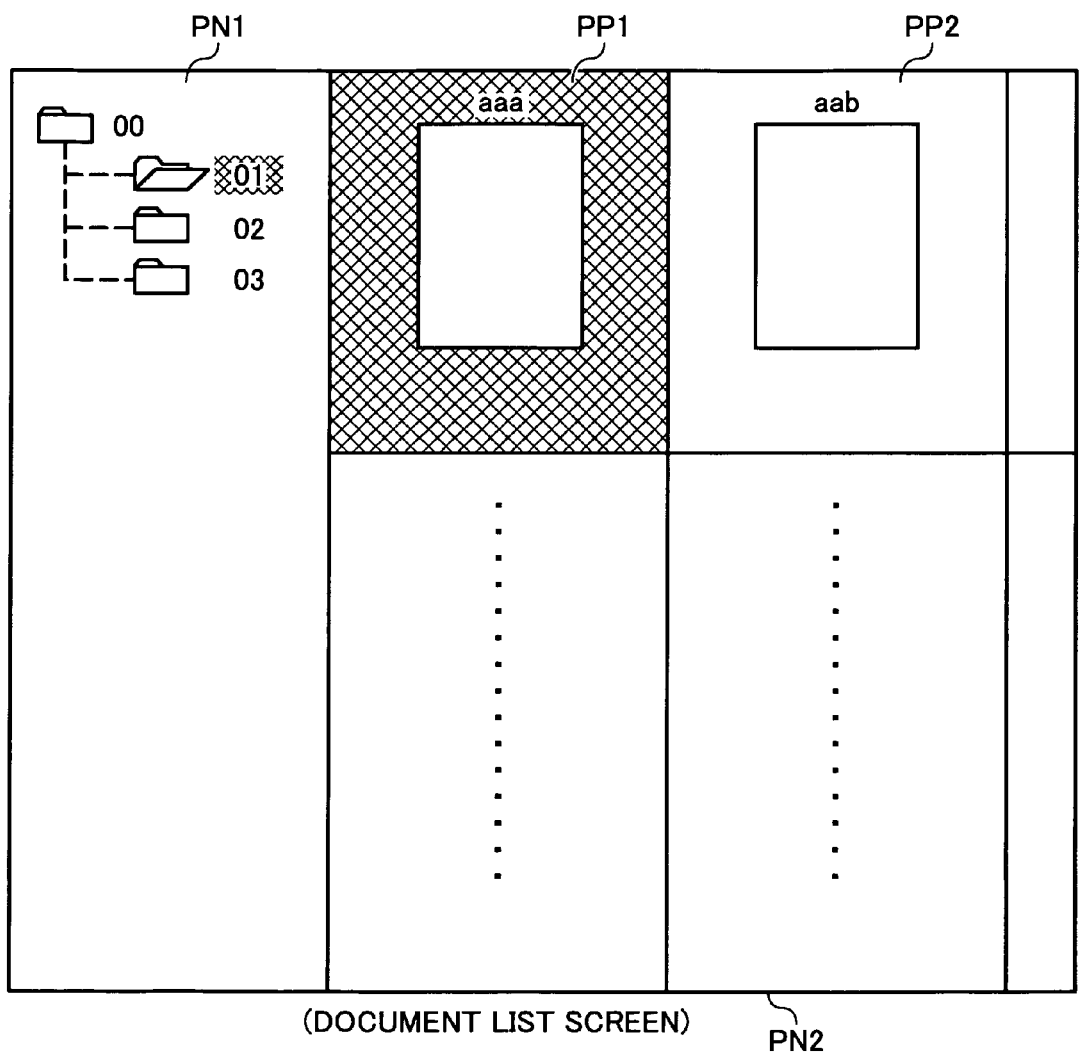
FIG. 6 is a diagram illustrating a display example of the document list screen, according to an exemplary embodiment.

Referring now to FIG. 6, there is provided a diagram illustrating a display example of the document list screen.

The document list screen shown in FIG. 6 includes at least a screen PN1 and a screen PN2. The screen PN1 is a screen to display a tree structure of folders. The screen PN2 is a screen to display, using an icon, at least one document stored in the folder selected in the screen PN1.

In FIG. 6, a folder "01" is selected. Two documents with the document titles "aaa" and "aab" stored in the folder "01" are displayed in icons PP1 and PP2, respectively.

As shown in FIG. 6, the document "aaa" is selected in this case. Therefore, a property dialogue screen as shown in FIG. 7, for example, is displayed, and the property information of the document "aaa" is displayed.

The property dialogue screen includes at least a "BACK" button BB1, a "NEXT" button BB2, an "OK" button BB3, a "CANCEL" button BB4 and so forth that can be operated by the user. The buttons BB1 and BB2 are provided at the upper right, and the buttons BB3 and BB4 are provided at the bottom.

When the user operates the button BB2, that is, the "NEXT" button, the document files stored in the selected folder "01" are sequentially selected according to the order of display displayed on the document list screen. The property information of the selected document is sequentially displayed on the property dialogue screen.

Accordingly, when the user wishes to change the document, the property information of which the user wishes to display, the user need not close the property dialogue screen to select the next document and display the property dialogue screen again. As a result, the operability of the user is enhanced.

Furthermore, as shown in FIG. 8, when the user presses the button BB2 ("NEXT" button), and the displayed content of the property dialogue screen has been changed, a dialogue screen requesting the user to confirm whether or not the changed content is applicable is displayed.

Figure 9:
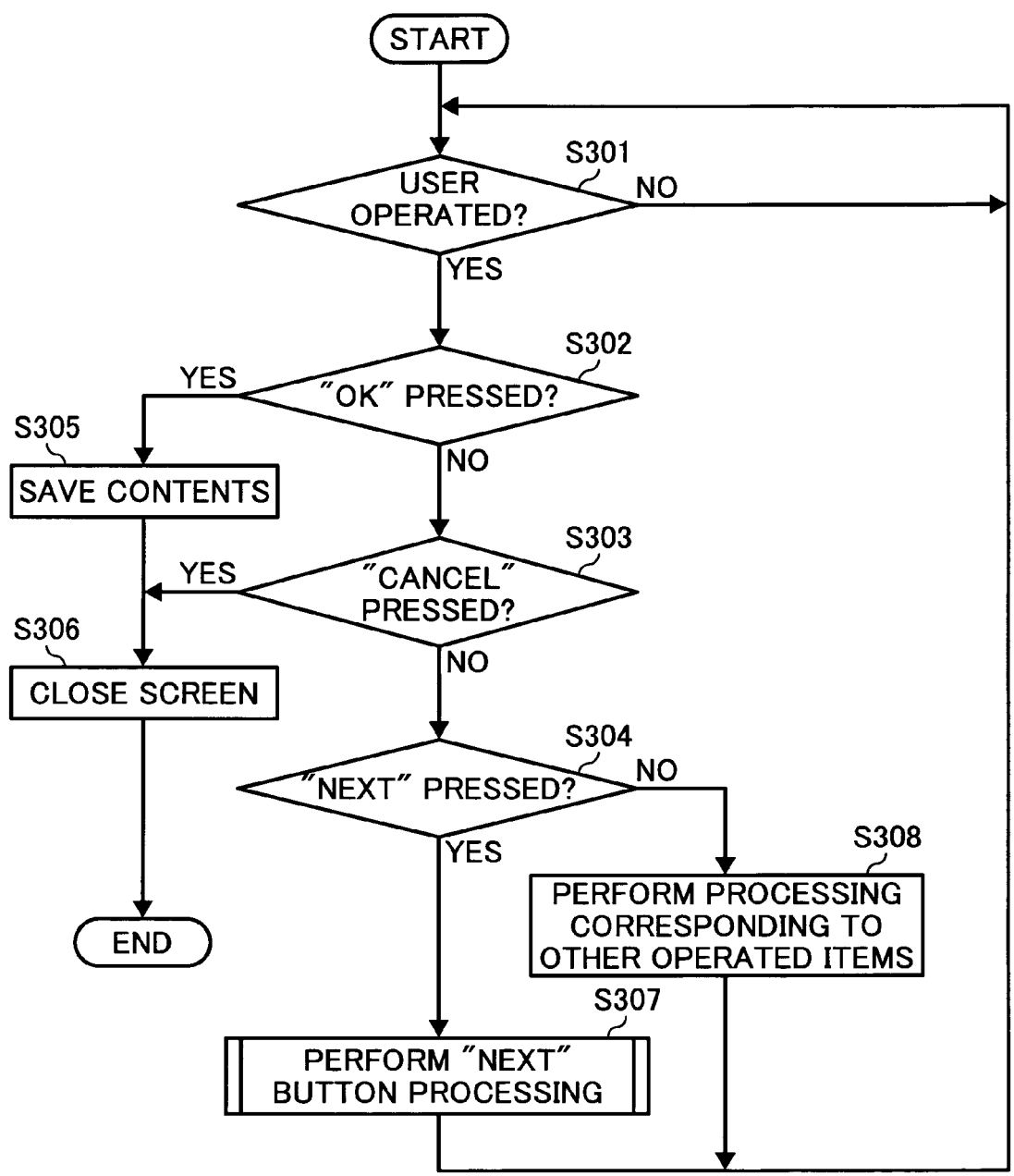
FIG. 9 is a flowchart showing an exemplary procedure of operation of the property dialogue screen, according to an exemplary embodiment of the present invention.

Referring now to FIG. 9, there is provided a flowchart showing an exemplary procedure of the operation of the property dialogue screen.

In FIG. 9, when the user operates the operation item displayed on the property dialogue screen, that is, the result is YES in step S301, whether the operation item is the "OK" button BB3 or the "CANCEL" button BB4 or the "NEXT" button BB2 or any other operation item is determined in steps S302, S303, and S304.

When the "OK" button BB3 is operated, and the result is YES in step S302, the operation contents are saved in step S305, and subsequently, the screen is closed in step S306.

When the "CANCEL" button BB4 is operated, and the result is YES in step S303, the procedure advances to step S306, and the screen is closed.

When the "NEXT" button BB2 is operated, and the result shows YES in step S304, the "NEXT" button processing described later is performed in step S307.

In a case where the operation item other than the "NEXT" button BB2 is operated, and when the result is NO in step S304, the process corresponding to the operated item is executed in step S308.

Figure 10:
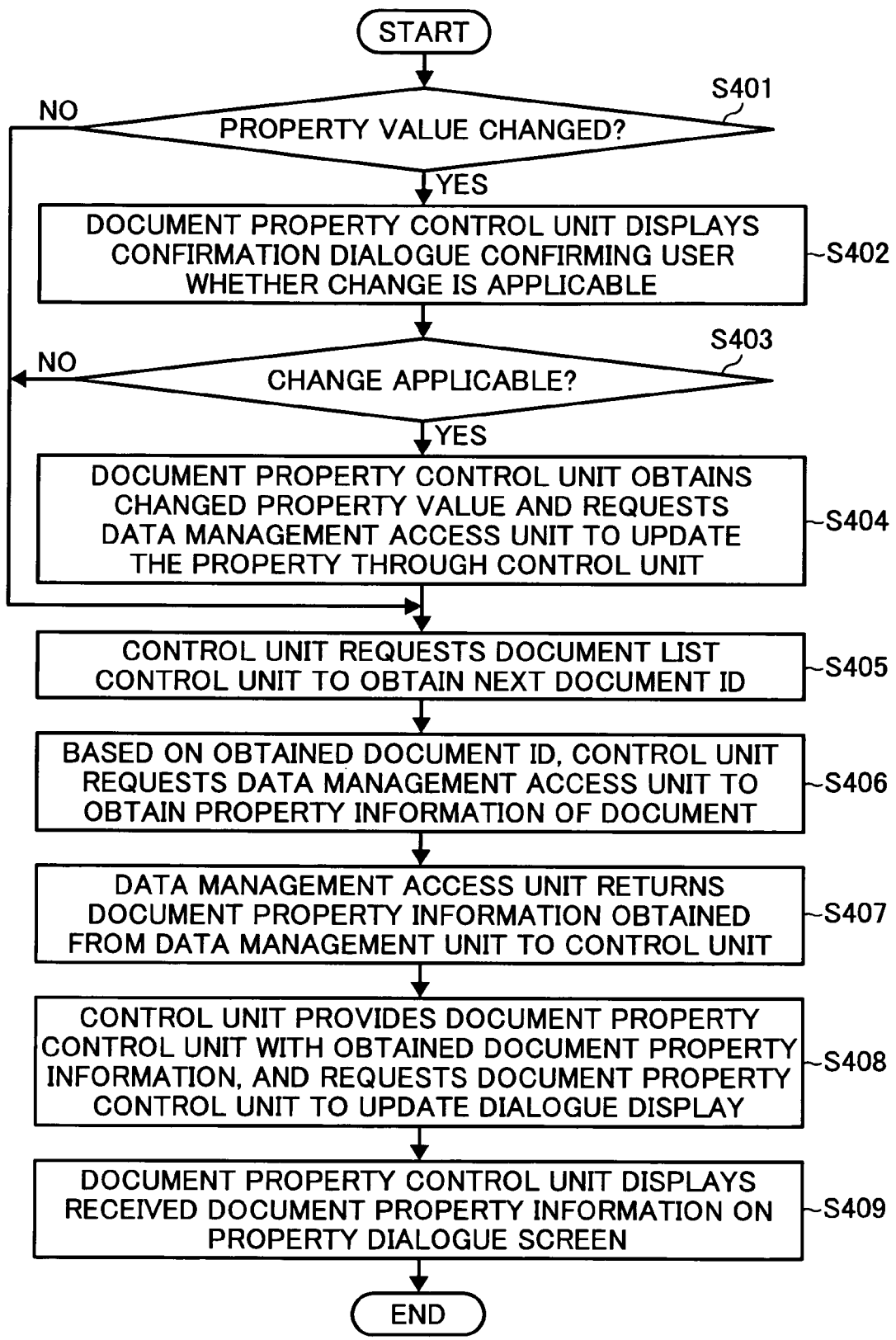
FIG. 10 is a flowchart showing an exemplary procedure of "next" button processing, according to an exemplary embodiment of the present invention.

Referring now to FIG. 10, there is provided an exemplary procedure of the "NEXT" button processing in step S307.

First, whether or not the property value is changed is determined in step S401. When the result is YES in step S401, in step S402 the document property control unit 3 displays the confirmation dialogue requesting the user to confirm whether or not the change is applicable.

When the user selects a dialogue "Apply change" in the confirmation dialogue screen, that is, the result is YES in step S403, the document property control unit 3 obtains the changed property value, and requests the data management access unit 5 to update the property through the control unit 2 in step S404.

When the result is NO in step S401 and step S403, the process advances to the next step S405.

The control unit 2 requests the document list control unit 4 to obtain an ID of the next document in step S405. Based on the obtained ID of the next document, the control unit 2 requests the data management access unit 5 to obtain the property information of the subject document in step S406.

Accordingly, the data management access unit 5 returns the document property information obtained from the data management unit 6 to the control unit 2 in step S407.

Subsequently, the control unit 2 provides the document property control unit 3 with the obtained document property information and requests the document property control unit 3 to update the display of the dialogue in step S408.

Accordingly, the document property control unit 3 displays on the property dialogue screen the received information of the document properties in step S409. As a result, the property information of the next document is displayed on the property dialogue screen.

According to the exemplary embodiments, the document, the document ID, and the document property information are saved in the data management unit 6, and are transmitted to the control unit 2 through the data management access unit 5.

Alternatively, the document, the document ID, and the document property information can be saved in an external server connected to the document management apparatus 100 through a network or the like. Based on the requirements of the document management apparatus 100, the document, the document ID, and the document property information can then be retrieved from the server through the network or the like.

According to the exemplary embodiments, the document properties can be continuously changed without closing the screen. Thus, the number of operation processes can be reduced, thereby enhancing operating efficiency.

Furthermore, based on the value previously input by the user, regularity can be found, thereby being able to display the candidate values. Thus, operability can be improved and the risk of human error and the like can be mitigated.

Furthermore, the document properties most likely to be subjected to input are displayed in a manner easily recognizable by the user. Accordingly, the possibility of omission of input by the user can be reduced if not prevented entirely.

Furthermore, elements and/or features of different exemplary embodiments may be combined with each other and/or substituted for each other within the scope of this disclosure and appended claims.

The number of constituent elements, locations, shapes and so forth of the constituent elements are not limited to any of the structure for performing the methodology illustrated in the drawings.

Still further, any one of the above-described and other exemplary features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

One or more embodiments of the present invention may be conveniently implemented using a conventional general purpose digital computer programmed according to the teachings of the present specification, as will be apparent to those skilled in the computer art.

Appropriate software coding can readily be prepared by skilled programmers based on the teachings of the present disclosure, as will be apparent to those skilled in the software art.

One or more embodiments of the present invention may also be implemented by the preparation of application specific integrated circuits or by interconnecting an appropriate network of conventional component circuits, as will be readily apparent to those skilled in the art.

Any of the aforementioned methods may be embodied in the form of a system or device, including, but not limited to, any of the structure for performing the methodology illustrated in the drawings.

Furthermore, any of the aforementioned methods may be embodied in the form of a program. The program may be stored on a computer readable media and is adapted to perform any one of the aforementioned methods, when run on a computer device (a device including a processor). The program may include computer executable instructions for carrying one or more of the steps above and/or more aspects of the invention.

Thus, the storage medium or computer readable storage medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of a built-in medium include, but are not limited to, rewriteable non-volatile memories, such as ROMs and flash memories, and hard disks.

Examples of a removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Example embodiments being thus described, it will be obvious that the same may be varied in many ways. Such exemplary variations are not to be regarded as a departure from the spirit and scope of the present invention, and all such modifications as would be obvious to one skilled in the art are intended to be included within the scope of the following claims.

What is claimed is:

1. A document management apparatus for managing stored documents together with document properties that are attribute information attached to the documents, the document management apparatus comprising:
    a document property continuous setting unit configured to continuously show one or more properties of each of a plurality of documents as compared to one or more properties of a document having undergone a property setting when changing the document properties of the plurality of the documents;
    a document list display unit configured to display a list of selected documents to property editing;
    a document display unit configured to display a document the properties of which have been changed,
    the document display unit including at least one of a document list color change unit configured to change a color of and display the document, a document list font change unit configured to change a font of and display the document, and document list icon display unit configured to attach an icon to the document.

2. The document management apparatus according to claim 1, further comprising:
    a first candidate value attachment unit configured to automatically display a candidate value for a document of the plurality of the documents, the properties of which are input based on a previously input value; and
    a second candidate value cancellation unit configured to cancel a function of the first candidate value attachment unit based on a number of documents beyond the document having undergone the property setting.

3. The document management apparatus according to claim 1, further comprising a document property display enhancement unit configured to display an item of the document properties changed previously, the document property display enhancement unit including at least one of a document property color change unit configured to change a color of the item of the document properties and a document property font change unit configured to change a font of the item.

4. The document management apparatus according to claim 1, wherein the document property continuous setting unit is further configured to set the one or more properties of each of the plurality of documents to a same value for each of the one or more properties if the plurality of documents are stored in a same folder.

5. A method for managing stored documents together with document properties that are attribute information attached to the documents, comprising:
    continuously show one or more properties of each of a plurality of documents as compared to one or more properties of a document having undergone a property setting when changing the document properties of the plurality of the documents;
    displaying a list of selected documents to property editing; and
    displaying a document from the list of selected documents, the properties of which have been changed, the displaying the document including at least one of changing a color of and displaying the document, changing a font of and displaying the document, and attaching an icon to the document.

6. The method according to claim 5, further comprising:
    automatically displaying a candidate value for a document of the plurality of the documents, the properties of which are input based on a previously input value; and
    canceling a function of the candidate value attachment unit based on a number of documents beyond the document having undergone the property setting.

7. The method according to claim 5, further comprising displaying an item of the document properties changed previously, the displaying including at least one of changing a color of the item of the document properties and changing a font of the item.

8. The method according to claim 5, further comprising:
    determining if any of the plurality of documents are stored in a same folder; and
    setting the one or more properties of each of the plurality of documents determined to be in the same folder to a same value for each of the one or more properties.

9. A computer readable storage medium storing a program for causing a computer to execute a method of managing stored documents together with document properties that are attribute information attached thereto, the method comprising:
    continuously show one or more properties of each of a plurality of documents as compared to one or more properties of a document having undergone a property setting when changing the document properties of the plurality of the documents;
    displaying a list of selected documents to property editing; and
    displaying a document from the list of selected documents, the properties of which have been changed, the displaying the document including at least one of changing a color of and displaying the document, changing a font of and displaying the document, and attaching an icon to the document.

* * * * *